United States Patent [19]
Tobita

[11] Patent Number: 4,506,573
[45] Date of Patent: Mar. 26, 1985

[54] SHEARING MACHINE
[75] Inventor: Chuo Tobita, Isehara, Japan
[73] Assignee: Amada Company, Limited, Isehara, Japan
[21] Appl. No.: 453,914
[22] Filed: Dec. 28, 1982
[30] Foreign Application Priority Data
Dec. 28, 1981 [JP] Japan .................. 56-193053
[51] Int. Cl.³ .............................................. B26D 7/18
[52] U.S. Cl. ........................................ 83/153; 83/169; 83/694
[58] Field of Search ................ 83/153, 154, 102, 380, 83/109, 599, 693, 694, 167
[56] References Cited
U.S. PATENT DOCUMENTS
1,781,111 11/1930 Klaucke .

3,055,275 9/1962 Schroter .................. 83/153 X
3,080,840 3/1963 DeMan .................... 83/153 X
3,691,887 9/1972 Roch ....................... 83/380 X Primary Examiner—Donald R. Schran
Attorney, Agent, or Firm—Armstrong, Nikaido, Marmelstein & Kubovcik

[57] ABSTRACT

A shearing machine is disclosed which comprises a work table, a pair of upper and lower blades for cutting a work-sheet, and a feeder for feeding the work-sheet onto the work table for cutting by the blades. A scrap receiver receives scrap cut from the work-sheet by the blades and a scrap remover positioned in front of the blades clamps and holds a piece of scrap from the work-sheet and transports the scrap to the scrap receiver. The scrap remover is movable in a horizontal plane above the work table.

9 Claims, 9 Drawing Figures

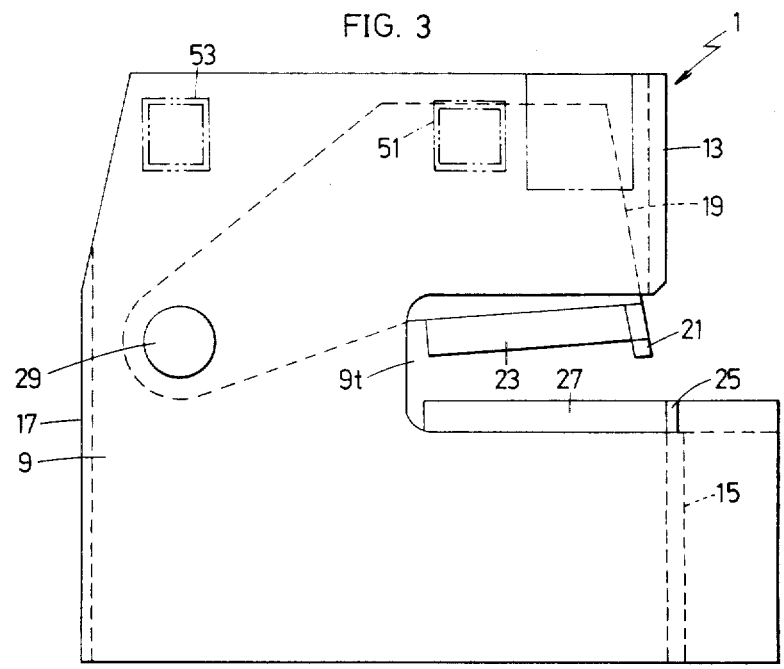
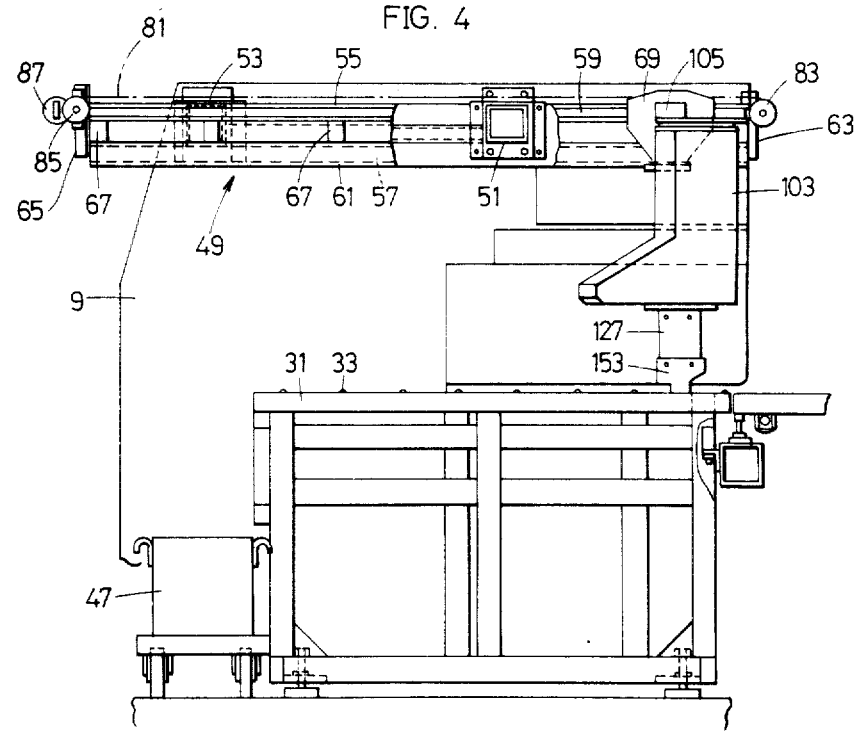

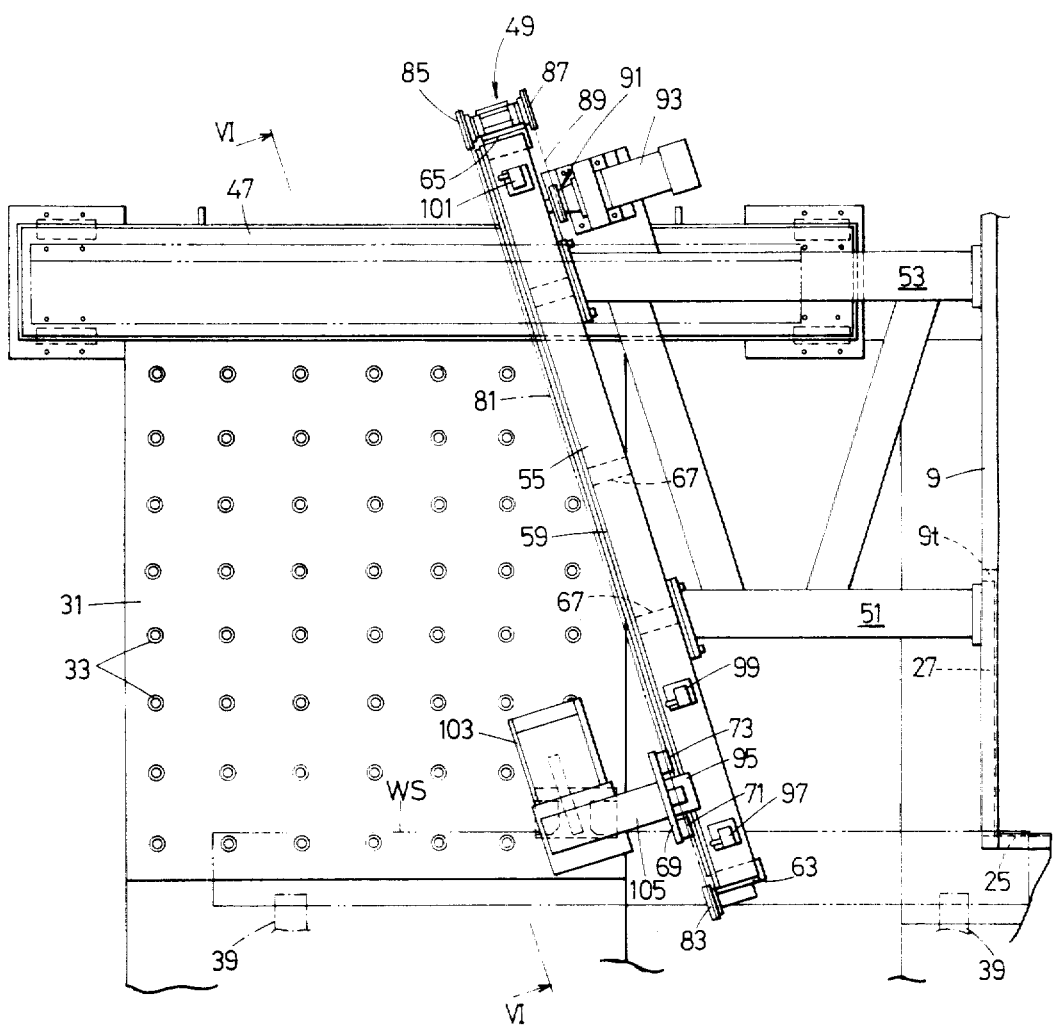

4,506,573

SHEARING MACHINE

BACKGROUND OF THE INVENTION

1. Field of the Invention

The present invention generally relates to a shearing machine for cutting or shearing sheet-like workpieces such as sheet metals, and more particularly the present invention pertains to a shearing machine which is provided with a scrap removing means for removing scraps produced from workpieces during shearing operations.

2. Description of the Prior Art

As is well-known, a shearing machine which is often provided with a pair of upper and lower blades is used to cut or shear a sheet-like workpiece such as a sheet metal into many finished sheets which are referred to as blanks. After a work-sheet that is a sheet-like workpiece has been sheared into as many blanks as possible in such a shearing machine, the end portion of the work-sheet which is often clamped by a clamping means cannot be utilized as a blank and is disposed of as a scrap.

Heretofore, it has been customary that scraps produced from work-sheets during shearing operations are handled in the same manner as blanks to be mingled into blanks. Accordingly, it has been necessary in conventional shearing machines to pick up or select out scraps from blanks after work-sheets have been sheared in shearing operations.

There have been some shearing machines which are provided with a scrap removing means for removing a scrap each time when a work-sheet has been sheared into blanks. However, in conventional shearing machines, such a scrap removing means is so arranged as to remove scraps at a position where work-sheets are to be fed to be sheared. Accordingly, it has been conventionally disadvantageous that work-sheets cannot be fed to be sheared when scraps are being removed with a result that plenty of idle time is necessary, even if a scrap removing means is provided.

SUMMARY OF THE INVENTION

It is a general object of the present invention to provide a shearing machine which is provided with a scrap removing means for removing scraps produced from work-sheets to be sheared during shearing operations.

It is an object of the present invention to provide a shearing machine which is provided with a scrap removing means by which scraps produced from work-sheets can be removed without mingling into finished sheets or blanks.

It is another object of the present invention to provide a shearing machine which is provided with a scrap removing means which can remove a scrap without idle time when another work-sheet is being fed to be sheared.

It is another object of the present invention to provide a shearing machine which is provided with a scrap removing means which can remove large and long scraps.

In order to attain the above objects of the present invention, a shearing machine is so arranged that scraps are taken and brought away directly into a scrap box as soon as a work-sheet has been completely sheared into finished sheets or blanks.

Other and further objects and advantages of the present invention will be apparent from the following description and accompanying drawings which, by way of illustration, show preferred embodiment of the present invention and the principles thereof.

BRIEF DESCRIPTION OF THE DRAWINGS

FIG. 3 is a sectional view taken along the line III—III of FIG. 2.

FIG. 4 is a sectional view taken along the line IV—IV of FIG. 2.

FIG. 5 is a partial top plan view of the shearing machine shown in FIG. 2.

DESCRIPTION OF THE PREFERRED EMBODIMENTS

Figure 1:
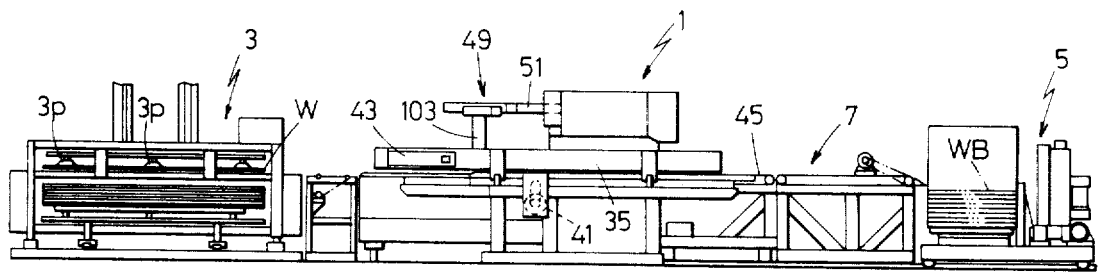
FIG. 1 is a front elevational view showing a shearing machine embodying the principles of the present invention.
Figure 2:
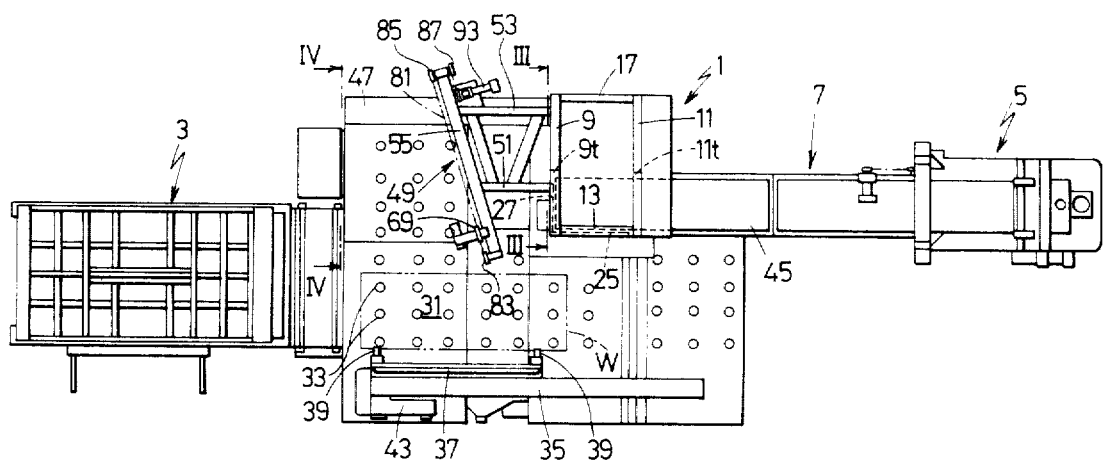
FIG. 2 is a top plan view of the shearing machine shown in FIG. 1.

Referring now to FIGS. 1 and 2, a shearing machine 1 for shearing work-sheets W such as sheet metals is shown as connected to a sheet loading apparatus 3 having a pick-up means 3p on one hand and also connected to a sheet stacking apparatus 5 through a conveyor 7 on the other hand. The arrangement is such that the shearing machine 1 is fed with the work-sheets W from the sheet loading apparatus 3 and shears them into finished sheets namely blanks WB which are to be conveyed to the sheet stacking apparatus 5 by the conveyor 7.

As best shown in FIGS. 2 and 3, shearing machine 1 comprises a pair of C-shaped upright plates 9 and 11 which are formed at their midway portions with throats $9t$ and $11t$, respectively, and are connected with each other by an upper front plate 13, a lower front plate 15 and a rear plate 17 to form a box-like frame. Particularly, the upright plates 9 and 11 are disposed in parallel with each other, and the upper and lower front plates 13 and 15 are fixed to the upper and lower portions, respectively, of the forward ends of the upright plates 9 and 11 at right angles therewith. Also, the throats $9t$ and $11t$ of the upright plates 9 and 11 are horizontally formed on a level with each other in such a manner as to extend in parallel with each other and open forwardly about the top of the lower front plate 15 so that a work-sheet W to be sheared can be inserted thereinto.

The shearing machine 1 is provided with a ram 19 carrying an elongated upper front blade 21 and an elongated upper side blade 23, and it is also provided with an elongated lower front blade 25 and an elongated lower side blade 27. The ram 19 is so disposed as to be moved up and down between the upright plates 9 and 11 behind the front upper plate 13 in a conventional manner to move the upper front and side blades 21 and 23 up and down. In the preferred embodiment, the ram 19 is pivotally held on a pivot means 29 such as a shaft held between the upright plates 9 and 11 in such a manner as to be swung up and down by a suitable drive means (not shown), although it can be so arranged as to be vertically moved along vertical guide means. The upper front blade 21 is detachably fixed to the forward bottom end of the ram 19 in parallel with the upper front plate 13 and the upper side blade 23 is detachably fixed to the side of the ram 19 in parallel with the upright plate 9. More specifically, the upper front and side blades 21 and 23 are fixed to the ram 19 in such a manner to be integrally connected with each other at a right angle to work as a single L-shaped blade. On the other hand, the lower front blade 25 is detachably and horizontally fixed to the top of the lower front plate 15 and the lower side blade 27 is detachably and horizontally fixed to the throat 9t of the upright plate 9 on a level with the lower front blade 25. In the same manner as the upper front and side blades 21 and 23, the lower front and side blades 25 and 27 are integrally connected with each other so as to work as a single L-shaped blade. Thus, when the ram 19 is lowered, the upper front and side blades 21 and 23 will be brought by the ram 19 integrally simultaneously into engagement with the lower front and side blades 25 and 27 to cooperate therewith to shear a work-sheet W which is to be placed on the lower front and side blades 25 and 27.

As shown in FIGS. 1 and 2, the shearing machine 1 is provided with a work-table 31 on which the work-sheet W to be sheared is placed to be fed into between the upper front and side blades 21 and 23 and the lower front and side blades 25 and 27 into the throats 9t and 11t of the upright plates 9 and 11. The work-table 31 is so constructed that its top surface having a plurality of ball sliders 33 is substantially on a level with the top of the lower front and side blades 25 and 27. In order to feed and position the work-sheet W to be sheared, the work-table 31 is provided with a first carriage 35 horizontally movable and a second carriage 37 slidably mounted on the first carriage 35 and having a plurality of clamping means 39 to carry the work-sheet W. The first carriage 35 is so arranged as to be horizontally moved on the work-table 31 toward and away from the lower front and side blaes 25 and 27 by a motor 41 to carry the second carriage 37. Also, the second carriage 37 is so arranged as to be horizontally moved on the first carriage 35 rightward and leftward by a motor 43 to carry the clamping means 39 holding the work-sheet W to be sheared. Thus, the work-sheet W is loaded from the sheet loading apparatus 3 by the pick-up means 3p and is gripped by the clamping means 39, and it is fed onto the lower front and side blades 25 and 27 by the first and second carriages 35 and 37. Also, it will be understood that the work-sheet W placed on the work-table 31 and held by the claming means 39 can be fed and positioned anywhere onto the lower front and side blades 25 and 27 by moving the first and second carriages 35 and 37.

In the above described arrangement, the work-sheet W can be sheared when it has been positioned onto the lower front and side blades 25 and 27 by the first and second carriages 35 and 37 and the ram 19 is lowered to enable the upper front and side blades 21 and 23 to cooperate with the lower front and side blades 25 and 27. The work-sheet W will be sheared, of course, into a L-shaped configuration in each shearing cycle to produce a square finished sheet or blank, when it is positioned on both of the lower front and side blades 25 and 27. However, the work-sheet W can be straightly sheared when positioned either of the lower front and side blades 25 and 27, and mostly the work-sheet W is sheared straightly by the upper and lower front blades 21 and 25 which are longer than the upper and lower side blades 23 and 27, respectively. Furthermore, even if the work-sheet W is larger width than the length of the upper and lower front blades 21 and 25, it can be straightly sheared or slit if it is fed little by little along the upper and lower front blades 21 and 25 with the ram 19 continuously stroked. As will be readily understood, the finished sheet or blands WB which are sheared from the work-sheet W will be dropped into behind the lower front and side blades 25 and 27, and they are brought away in a manner as will be described immediately hereinafter. Also, the end porion of the work-sheet W which is gripped by the clamping means 39 is removed as a scrap according to the present invention as will be described in great detail hereinafter.

As is also shown in FIGS. 1 and 2, the shearing machine 1 is provided with a conveying means 45 to bring out the finished sheets or blanks WB which are sheared from the work-sheet W by the upper front and side blaes 21 and 23 and the lower front and side blades 25 and 27. The conveying means 45, which is shown as a belt conveyor, is disposed behind the lower front and side blades 25 and 27 to project out of the shearing machine 1, and it is connected to the conveyor 7 which is further connected to the stacking apparatus 5. Thus, the blanks WB sheared from the work-sheet W are received and brought out by the conveying means 45 to the conveyor 7, and then they are conveyed to the stacking apparatus 5 by means of the conveyor 7.

As shown in FIGS. 2 and 5 inclusive, there is provided a scrap box 47 behind the work-table 31 and outside the upright plate 9 to receive scraps which will be produced from work-sheets W during shearing operations. As has been described a little hereinbefore, the end porion of the work-sheet W which is gripped by the clamping means 39 of the second carriage 37 cannot be utilized as a blank and is disposed of as a scrap WS after the work-sheet W has been sheared into as many blanks as possible. The scrap box 47, which is shown in FIG. 4 as a movable cart, is provided outside the upright plate 9 in close proximity to the work-table 31 so that the scraps can be dropped thereinto from the top surface of the work-table 31.

Referring to FIGS. 1, 2, 4 and 5, in order to drop the scraps into the scrap box 47 from the work-table 31, there is provided a scrap removing means 49 above the work-table 31 outside the upright plate 9 according to the present invention. In order to hold the scrap removing means 49, beams 51 and 53 are horizontally fixed to the outside of the upright plate 9 to extend above the work-table 31 in a cantilever manner, and a pair of upper and lower beams 55 and 57 are horizontally fixed to the ends of the beams 51 and 53. The upper beams 55 is provided with a rail 59 such as a linear motion guide, and the lower beam 57 is provided with an elongated guide plate 61 and is disposed just beneath the upper beam 55 in parallel therewith. The upper and lower beams 55 and 57 are rigidly and fixedly connected with each other in parallel by plates 63 and 65 at their front and rear ends, respectively, and also by a plurality of blocks 67 between their ends. For a purpose which will be seen hereinafter, the upper and lower beams 55 and 57 are horizontaly held by the beams 51 and 53 at an angle to the outside surface of the upright plate 9 as seen from FIGS. 2 and 5 in a manner such that their front ends are closer to the upright plate 9 than their rear ends. Also, the rail 59 is horizontally fixed to the outer side of the upper beam 55 opposite to the upright plate 9, and the guide plate 61 is also horizontally fixed to the outer side of the lower beam 57 opposite to the upright plate 9 with its flat sides vertically disposed.

As shown in FIGS. 4 to 7 iclusive, the scrap removing means 49 comprises a carriage 69 which is slidably mounted on the rail 59 by means of bearing means 71 and 73 to move forward and rearward along the upper and lower beams 55 and 57. The carriage 69 is so arranged as to be guided by the guide plate 61 by mens of guide rollers 75 and 77 which are rotatably held in contact with the guide plate 61 by a bracket 79 fixed to the lower end of the carriage 69. More particularly, the bracket 79 is horizontally fixed to the lower end of the carriage 69 to extend beneath the guide plate 61, and the guide rollers 75 and 77 are held on the bracket 79 to rotatably hold the opposite sides of the guide plate 61. In order to move the carriage 69 along the rail 59, a chain 81 is connected to the carriage 69 and is trained around a pair of sprockets 83 and 85 which are rotatably mounted on the plates 63 and 65, respectively, at the front and rear ends of the upper and lower beams 55 and 57. Also, in order to drive the chain 81, another sprocket 87 is coaxially connected by a chain 89 to a sprocket 91 fixed to an output shaft of a motor 93 which is moutned on the beam 53. Thus, when the sprocket 91 is driven by the motor 93 to rotate the sprockets 87 and 85 through the chain 89, the carriage 69 is moved by the chain 81 forward and rearward along the rail 59. Also, the carriage 69 is provided with a dog member 95, and the upper beam 55 is provided at its top surfac with limit switches 97, 99 and 101 which are to be actuated by the dog member 95 as will be described hereinafter.

Figure 6:
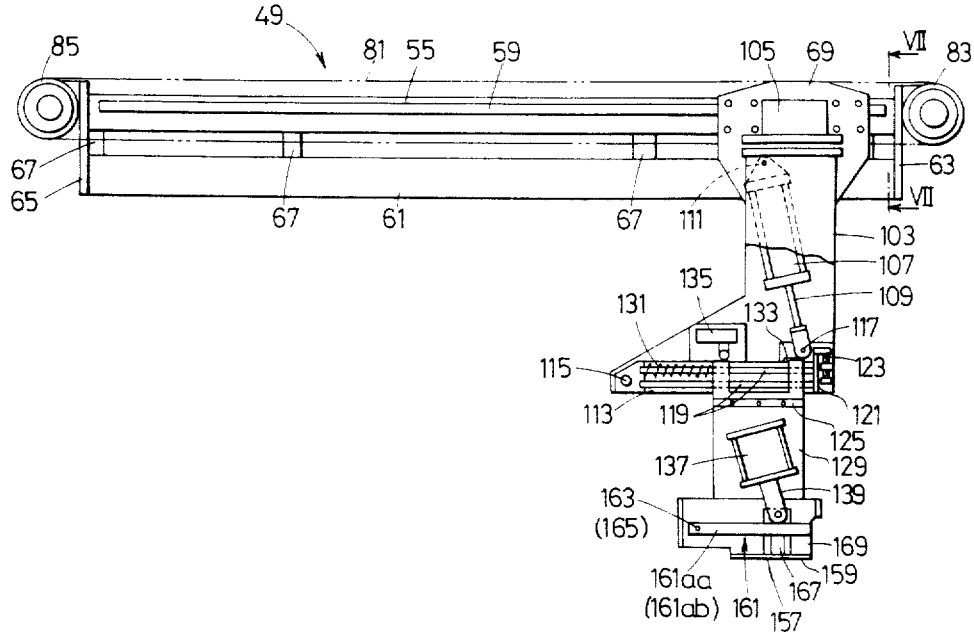
FIG. 6 is a partial view taken along the line VI—VI of FIG. 5.
Figure 7:
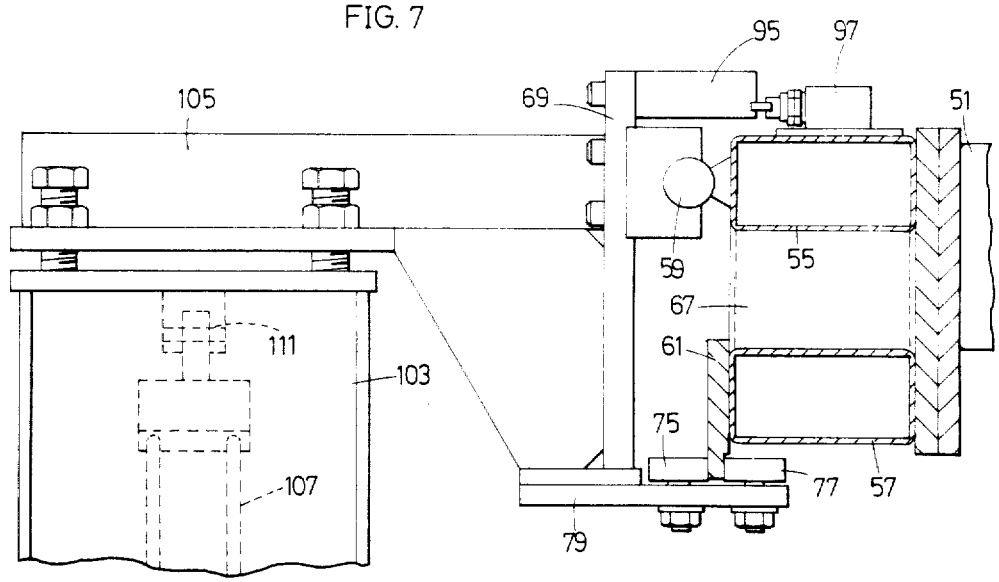
FIG. 7 is a sectional view taken along the line VII—VII of FIG. 6.

As shown in FIGS. 5, 6 and 7, a housing 103, which is of a somewhat boot-like shape in the preferred embodiment, is mounted on the carriage 69 by means of a supporting member 105 to depend downwardly therefrom. In the housing 103, a pneumatic or hydraulic motor 107 of a cylinder type having a piston rod 109 is pivotally provided by a pin 111, and a swing member 113 is also pivotally provided by means of a pin 115. The pneumatic or hydraulic motor 107 is disposed to depend downwardly with its piston rod 109 downwardly projected, and the piston rod 109 is pivotally connected to the swing member 113 by a pin 117 to swing it around the pin 115. The swing member 113 is of a more or less elongated shape, and it is disposed at the lower end of the housing 103 in parallel with the rail 59 with its rear end pivoted by the pin 115 in such a manner as to be normally kept horizontal. The swing member 113 is provided with a plurality of guide rods 119 which are disposed in parallel with the rail 59 in such a manner as to be normally horizontal for a purpose which will be described immediately hereinafter. Also, in order to stop the swing member 113 from downwardly swinging around the pin 115, a hook member 121 is fixed to the front end of the swing member 113 and stop member 123 is provided to stop and hold the hook member 121. Thus, the swing member 113 is normally kept horizontal with its front end held by the stop member 123, but it is swung by the piston rod 109 of the pneumatic or hydraulic motor 107 around the pin 115 when the motor 107 is supplied with the pneumatic or hydraulic fluid.

Figure 8:
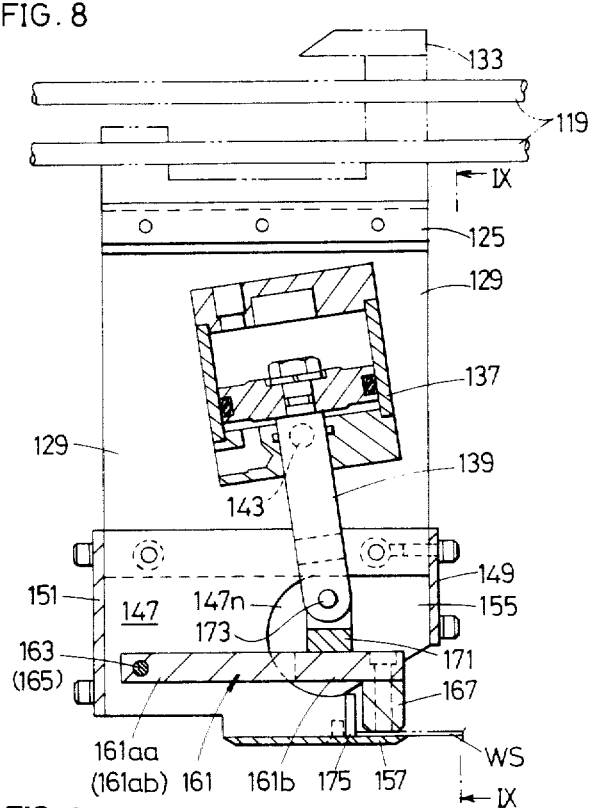
FIG. 8 is a sectional view taken along the line VIII—VIII of FIG. 9.
Figure 9:
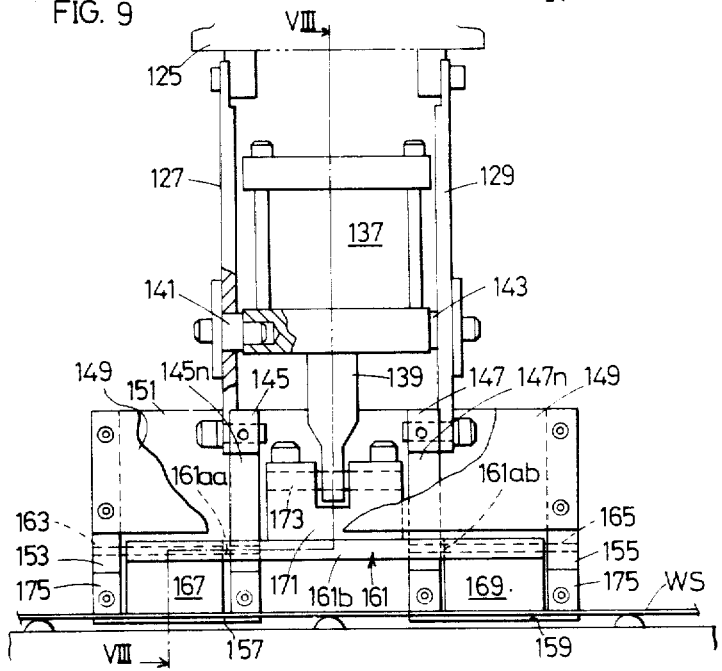
FIG. 9 is a partial sectional view taken along the line IX—IX of FIG. 8.

Referring to FIGS. 6, 8 and 9, a carrying member 125, which has a pair of plates 127 and 129 depending downwardly in parallel with each other, is slidably mounted on the guide rods 119 on the swing member 113. Specifically, the plates 127 and 129 are fixed to the carrying member 125 in such a manner as to depend therefrom in parallel with each other to form a box-like housing which is open forwardly and rearwardly as seen from FIG. 9. The carrying member 125 is kept biased forwardly away from the pin 115 by a spring or springs 131 which are provided on the swing member 113, although of course it can be moved along the guide rods 119 against the spring(s) 131. Also, the carrying member 125 is provided with a dog member 133 which is so arranged as to actuate a limit switch 135 provided on the swing member 113 when the carrying member 125 is moved on the guide rods 119 against the spring(s) 131. Thus, the carrying member 125 is normally kept forwardly biased by the spring(s) 131 but it can be moved rearwardly on the guide rods 119 against the springs 131 to bring the dog member 133 into contact with the limit switch 135.

As shown also in FIGS. 6, 8 and 9, a pneumatic or hydraulic motor 137 of a cylinder type having a piston rod 139 is pivotally disposed between the plates 127 and 129 in a manner such that the piston rod 139 will be downwardly projected. In the preferred embodiment, the pneumatic or hydraulic motor 137 is pivotally held between the plates 127 and 129 in a trunnion manner by a pair of pins 141 and 143 which are pivotally provided on the plates 127 and 129, respectively, at right angles thereto. Thus, the pneumatic or hydraulic motor 137 can be swung between the plates 127 and 129 forward and rearward around the pins 141 and 143 on a plane which is in parallel with the flat sides of the plates 127 and 129.

As best shown in FIGS. 8 and 9, a pair of square plates 145 and 147, which are formed at their ends with notches 145n and 147n, respectively, are fixed to the lower ends of the plates 127 and 129, respectively. More specifically, the plates 145 and 147 are fixed to the lower ends of the plates 127 and 129, respectively, in parallel with each other in such a manner as to depend downwardly therefrom with their notches 145n and 147n located at the lower front ends of the plates 127 and 129, respectively. Also, an elongated front plate 149 is horizontally fixed to the front ends of the plates 145 and 147 without covering the lower ends thereof in a manner such that their ends are disposed to symmetrically extend horizontally sideward or outward from the plates 145 and 147 by the same lengths like cantilevers. In the more or less same manner as the front plates 149, another elongated rear plate 151, which is of the same length as the front plate 149, is fixed to the rear ends of the plates 145 and 147, symmetrically extend horizontally sideward or outward therefrom like cantileves. Furthermore, a pair of plates 153 and 155 which of the same square-like shapes are fixedly secured to the ends of the front and rear plates 149 and 151 in parallel with each other in a manner such that their lower ends are on the same level with the lower ends of the plates 145 and 147.

As shown also in FIGS. 8 and 9, a pair of plate-like lower clamping jaw members 157 and 159 are horizontally fixed to the lower ends of the plates 145 and 153 and the lower ends of the plates 147 and 155, respectively, to clamp the scrap WS sheared from the worksheet W. More specifically, the lower clamping jaw members 157 and 159 are fixed between the lower ends of the plates 145 and 153 and between the lower ends of the plates 147 and 155, respectively, in such a manner as to horizontally project therefrom outwardly and forwardly to clamp the scrap WS. Also, a U-shaped swing member 161 having a body portion 161b and a pair of arms 161aa and 161ab are pivotally connected to the plates 145, 153, 147 and 155 by means of pins 163 and 165 to hold a pair of upper clamping jaw members 167 and 169 which are to cooperate with the lower clamping jaw members 157 and 159 to clamp the scrap WS. The swing member 161 is so disposed that the body portion 161b is located in the notches 145n and 147n of the plates 145 and 147 and the arms 161aa and 161ab are pivotally supported between and the plates 145 and 153 and between the plates 147 and 155, respectively, by the pins 163 and 165, respectively. The upper clamping jaw member 167 is fixed to the underside of the body portion 161b of the swing member 161 between the plates 145 and 153 to cooperate with the lower clamping jaw member 157 to clamp the scrap WS. Likewise, the upper clamping jaw member 169 is fixed to the underside of the body 161b of the swing member 161 between the plates 147 and 155 to cooperate with the lower clamping member 159. The swing member 161 having the upper clamping jaw members 167 and 169 is pivotally connected to the piston rod 139 of the pneumatic or hydraulic motor 137 by means of a clevis 171 and a pin 173 so that it may be swung around the pins 163 and 165 by the motor 137. Thus, the upper clamping jaw members 167 and 169 will be lowered to cooperate with the lower clamping jaw members 157 and 159 to clamp the scrap WS when the piston rod 139 of the pneumatic or hydraulic motor 137 is projected to swing the swing member 161 downwardly around the pins 163 and 165. Also, stop members 175 are fixed to the front ends of the plates 145, 147, 153 and 155 to stop the scrap WS to be clamped by the upper clamping jaw members 167 and 169 and the lower clamping jaw members 157 and 159.

In the above described arrangement, the carriage 69 is moved forward and rearward along the rail 59 by the motor 93 to carry the pneumatic or hydraulic motor 107 and the swing member 113 holding the lower clamping jaw members 157 and 159 and the swing member 161 having the upper clamping jaw members 167 and 169. The swing member 113 is usually kept raised, and it is swung downwardly around the pin 115 by the pneumatic or hydraulic motor 107 to lower the upper clamping jaw members 167 anmd 169 and the lower clamping jaw members 157 and 159 when it is necessary to clamp the scrap WS. Also, the swing member 161 is swung downwardly around the pins 163 and 165 by the pneumatic or hydraulic motor 137 to enable the upper clamping jaw member 167 and 169 to clamp the scrap WS in cooperation with the lower clamping jaw members 157 and 159.

Referring back again to FIGS. 5, 6 and 7, the limit switches 97, 99 and 101 provided on the upper beam 55 and the limit switch 135 provided on the housing 103 are arranged to control the movements of the carriage 69, the swing member 113 and the swing member 161 holding the upper clamping jaw members 167 and 169. All the limit switches 97, 99, 101 and 135 are electrically connected to a controlling means (not shown) such as a numerical controlling unit for controlling the operation of the shearing machine 1. As has been described hereinbefore, the limit switches 97, 99 and 101 are actuated when contacted by the dog member 95 provided on the carriage 69, and the limit switch 135 is actuated when contacted by the dog member 133 provided on the carrying member 125. In this connection, the limit switch 99 is located at the waiting position where the carriage 69 is normally positioned on the rail 59 to wait to be ready to enable the upper and lower clamping jaw members 167 and 169 and 157 and 159 to clamp the scrap WS.

The limit switch 97 is so arranged as to stop the carriage 69 on the rail 59 at its forward travelling limit and move it rearward and side simultaneously swing the swing member 161 downwardly when touched by the dog member 95. Accordingly, when the limit switch 97 is contacted by the dog member 95, the scrap WS which is between the upper clamping jaw members 167 and 169 and the lower clamping jaw members 157 and 159 will be clamped and brought rearward. However, as will be seen hereinafter, the dog member 95 is not normally brought into contact with the limit switch 97, and normally the scrap WS will be clamped by the upper clamping jaw members 167 and 169 and the lower clamping jaw members 157 and 159 when the limit switch 135 is contacted by the dog member 133 provided on the carrying member 125. The limit switch 99 is so arranged as to stop, when contacted by the dog member 95, the carriage 69 coming from the rear limit at the waiting position where the carriage 69 is to be positioned to wiat for another clamping operation. The limit switch 101 is so arrranged as to stop the carriage 69 at its rear limit where the scrap box 47 is located, swing the swing member 161 upwardly around the pins 163 and 165, and then swing the swing member 113 upwardly around the pin 115 and then return the carriage 69 forwardly to the waiting position. Accordingly, the scrap WS which is clamped by the upper clamping jaw members 167 and 169 and the lower clamping jaw members 157 and 159 will be dropped into the scrap box 47 as soon as the dog member 95 is brought into contact with the limit switch 101. Also, the limit switch 135 is so arranged as to stop the carriage 69 to normally enable the upper clamping jaw members 167 and 169 to clamp the scrap WS with the lower clamping jaw members 157 and 159 and then move the carriage 69 to the rear limit when actuated by the dog member 133.

In operation, the carriage 69 is kept positioned at the waiting position where the dog member 95 is in contact with the limit switch 99, when the work-sheet W is being sheared by the upper front and side blades 21 and 23 and the lower front and side blades 25 and 27. When the carriage 69 is at the waiting position, the swing member 113 is kept raised to keep up the upper clamping jaw members 167 and 169 and the lower clamping jaw members 157 and 159, and the swing member 161 is also kept raised to keep the upper clamping jaw members 167 and 169 raised away from the lower clamping members 157 and 159. As soon as the work-sheet W has been completely sheared into blanks WB, the swing member 113 is swung downwardly around the pin 115 and the carriage 69 is moved forwardly on the rail 59 to bring the upper clamping jaw members 167 and 169 and the lower clamping jaw members 157 and 159 to the scrap WS clamped by the clamping means 39 on the work-table 31. When the stop members 175 provided near the lower clamping jaw members 157 and 159 are brought into the scrap WS, the carrying member 125 cannot be moved forwardly, although the carriage 69 will go on proceeding forwardly. Accordingly, after the stop members 175 have been brought into contact with the scrap WS, the carrying member 125 will be slid on the guide rods 119 and the carriage 69 will be moved against the spring(s) 131 to bring the limit switch 135 into contact with the dog member 133. Thus, when the limit switch 135 is brought into contact with the dog member 133, the swing member 161 will be swung downwardly to enable the upper clamping jaw members 167 and 169 to clamp the scrap WS with the lower clamping jaw members 157 and 159, and then the carriage 69 will be moved rearward to carry the scrap WS to the scrap box 47. Of course, the scrap WS is released from the clamping means 39 mounted on the second carriage 37 on the work-table 31, after having been clamped by the upper clamping jaw members 167 and 169 and the lower clamping jaw members 157 and 159. When the carriage 69 carrying the scrap WS has been brought along the rail 59 to its rear limit to bring the dog member 95 into contact with the limit switch 101, the scrap WS is released from the upper and lower clamping jaw members 167 and 169 and 157 and 159 to be dropped into the scrap box 47. After the scrap WS has been dropped into the scrap box 47, the swing member 113 will be raised to raise the upper and lower clamping jaw member 167 and 169 and 157 and 159, and the carriage 69 will be returned to the waiting position.

In the meantime, the limit switch 97 is actuated by the dog member 95 to stop and return the carriage 69 when the stop members 175 is not contactd by the scrap WS while the carriage 69 is going forward from the waiting position. In other words, the limit switch 97 is actuated by the dog member 95 when the limit switch 135 is not brought into contact with the dog member 133 in spite of the fact that the carriage 69 is moving forward from the waiting position. Accordingly, the limit switch 97 is actuated by the dog member 95 to stop and return the carriage 69 in case that the scrap WS clamped by the clamping means 39 on the work-table 31 bends down so that the stop members 175 cannot be brought into the scrap WS and in case that no scrap is clamped by the clamping means 39.

As has been far described in the above, the scrap WS produced from work-sheet W is taken and brought away into the scrap box 47 by the scrap removing means 49 having the upper and lower clamping jaw members 167 and 169 and 157 and 159 without mingling into the blanks WB as soon as the work-sheet W has been completely sheared into blanks WB. Since the scrap WS is directly brought into the scrap box 47 by the scrap removing means 49, the next work-sheet can be brought onto the work-table 31 and fed into between the upper front and side blade 21 and 23 and the lower front and side blades 25 and 27 without idle time when the scrap WS is being removed. It will be understood that the scrap removing means 49 will not obstruct the way where the work-sheet W is moved by the first and second carriages 35 and 37 on the work-table 31 to be sheared since the upper clamping jaw members 167 and 169 and the lower clamping jaw members 157 and 159 are held riased. Also, since the rail 59 for the carriage 69 of the scrap removing means 49 is disposed at an angle to the outer surface of the upright plate 9, the scrap WS can be brought into the scrap box 47 through the throat 9t of the upright plate 9 even if the scrap WS is large and long.

Although a preferred form of the present invention has been illustrated and described, it should be understood that the device is capable of modification by one skilled in the art without departing from the principles of the invention. Accordingly, the scope of the invention is to be limited only by the claim appended hereto.

I claim:

1. A shearing machine comprising
   (a) a work table
   (b) a pair of upper and lower blades for cutting a work-sheet;
   (c) feeding means for feeding the work-sheet onto the work table for cutting by the blades;
   (d) scrap receiving means for receiving scrap cut from the work-sheet by the blades; and
   (e) scrap removing means, positioned in front of the blades, for clamping and holding a piece of scrap from the work-sheet and for transporting the scrap to the scrap receiving means, wherein the scrap removing means is movable in a horizontal plane above the work table.

2. A shearing machine according to claim 1 wherein the upper and lower blades are L-shaped.

3. A shearing machine according to claim 1 wherein the scrap receiving means is position to the side of the work-table.

4. A shearing machine according to claim 2 or 3 wherein the feeding means can work while the scrap removing means is working.

5. A shearing machine according to claims 1 or 2 including guide means horizontally disposed above the work table, wherein the scrap removing means is movably mounted and guided on the guide means.

6. A shearing machine according to claim 5, wherein the scrap removing means includes a scrap clamping means the scrap clamping means being movable up and down with respect to the top surface of the work-table.

7. A shearing machine according to claim 5 wherein the guide means is disposed in the horizontal plane at an angle with respect to the blades.

8. A shearing machine according to claim 1 wherein the scrap removing means comprises:
   (a) rail means positioned at an angle with respect to the blades, the rail means being rigidly mounted on the shearing machine;
   (b) carriage means mounted on the rail means, the carriage means being movable along the rail means;
   (c) guide means, mounted on the rail means, for guiding the movement of the carriage means on the rail means; and
   (d) clamp means, mounted on the carriage means, for movement therewith, the clamp means clamping and holding a piece of scrap while the scrap is transported from the work table to the scrap receiving means by movement of the carriage means along the rail means.

9. A shearing means according to claim 8 including switch means operated in response to the movement of the scrap removing means for controlling to the movement thereof.

* * * * *